(12) United States Patent
Ammler

(10) Patent No.: US 10,408,348 B2
(45) Date of Patent: Sep. 10, 2019

(54) METHOD FOR OPERATING AN AUTOMATIC TRANSMISSION APPARATUS AND CORRESPONDING AUTOMATIC TRANSMISSION APPARATUS

(71) Applicant: AUDI AG, Ingolstadt (DE)

(72) Inventor: Stefan Ammler, Bergheim (DE)

(73) Assignee: AUDI AG, Ingolstadt (DE)

( * ) Notice: Subject to any disclaimer, the term of this patent is extended or adjusted under 35 U.S.C. 154(b) by 263 days.

(21) Appl. No.: 15/528,112

(22) PCT Filed: Nov. 6, 2015

(86) PCT No.: PCT/EP2015/075934
§ 371 (c)(1),
(2) Date: May 19, 2017

(87) PCT Pub. No.: WO2016/078939
PCT Pub. Date: May 26, 2016

(65) Prior Publication Data
US 2017/0314678 A1    Nov. 2, 2017

(30) Foreign Application Priority Data
Nov. 20, 2014  (DE) .................. 10 2014 017 172

(51) Int. Cl.
*F16H 63/34*  (2006.01)
(52) U.S. Cl.
CPC ..... *F16H 63/3491* (2013.01); *F16H 63/3483* (2013.01)
(58) Field of Classification Search
CPC ... F16H 63/34; F16H 63/3483; F16H 63/3491
See application file for complete search history.

(56) References Cited

U.S. PATENT DOCUMENTS

2011/0198190 A1  8/2011  Steinhauser et al.
2015/0308571 A1*  10/2015  Wyatt ................. F16H 63/3491
                                                               192/219.5

FOREIGN PATENT DOCUMENTS

CN  103649603 A  3/2014
DE      4447512 A1  3/1996
(Continued)

OTHER PUBLICATIONS

International Preliminary Report on Patentability dated Jun. 1, 2017 of corresponding application No. PCT/EP2015/075934; 17 pgs.

(Continued)

*Primary Examiner* — Jacob S. Scott
*Assistant Examiner* — Lori Wu
(74) *Attorney, Agent, or Firm* — Maier & Maier, PLLC

(57) ABSTRACT

A method for operating an automatic transmission apparatus having a parking lock device. The parking lock device has a hydraulic apparatus with a hydraulic cylinder and a hydraulic piston arranged therein, which can be placed in at least two positions by a lock apparatus and an emergency unlock apparatus. The hydraulic piston is operatively connected to a shifting shaft of the parking lock device, and a pressure can be adjusted in the hydraulic cylinder by a hydraulic valve. The shifting shaft can be shifted within an operating position range by the hydraulic apparatus. In doing so, upon activation of the emergency unlock apparatus, the shifting shaft is shifted into a position that is outside of the operating position range, and an operating state of the emergency unlock apparatus is checked.

7 Claims, 1 Drawing Sheet

(56) References Cited

FOREIGN PATENT DOCUMENTS

| DE | 10157459 C1 | 5/2003 |
|---|---|---|
| DE | 10 2009 018 122 A1 | 10/2010 |
| DE | 102009018975 A1 | 10/2010 |
| DE | 102011105068 A1 | 7/2012 |
| JP | 2008128444 A | 6/2008 |

OTHER PUBLICATIONS

Office Action dated Jul. 30, 2018 in corresponding Chinese Patent Application No. 201580072426.0; 16 pages including English-language translation.
International Search Report and Written Opinion dated Feb. 12, 2016 of corresponding application No. PCT/EP2015/075934; 14 pgs.
Office Action dated Oct. 22, 2015 of corresponding application No. DE10 2014 017 172.8; 4 pgs.

* cited by examiner

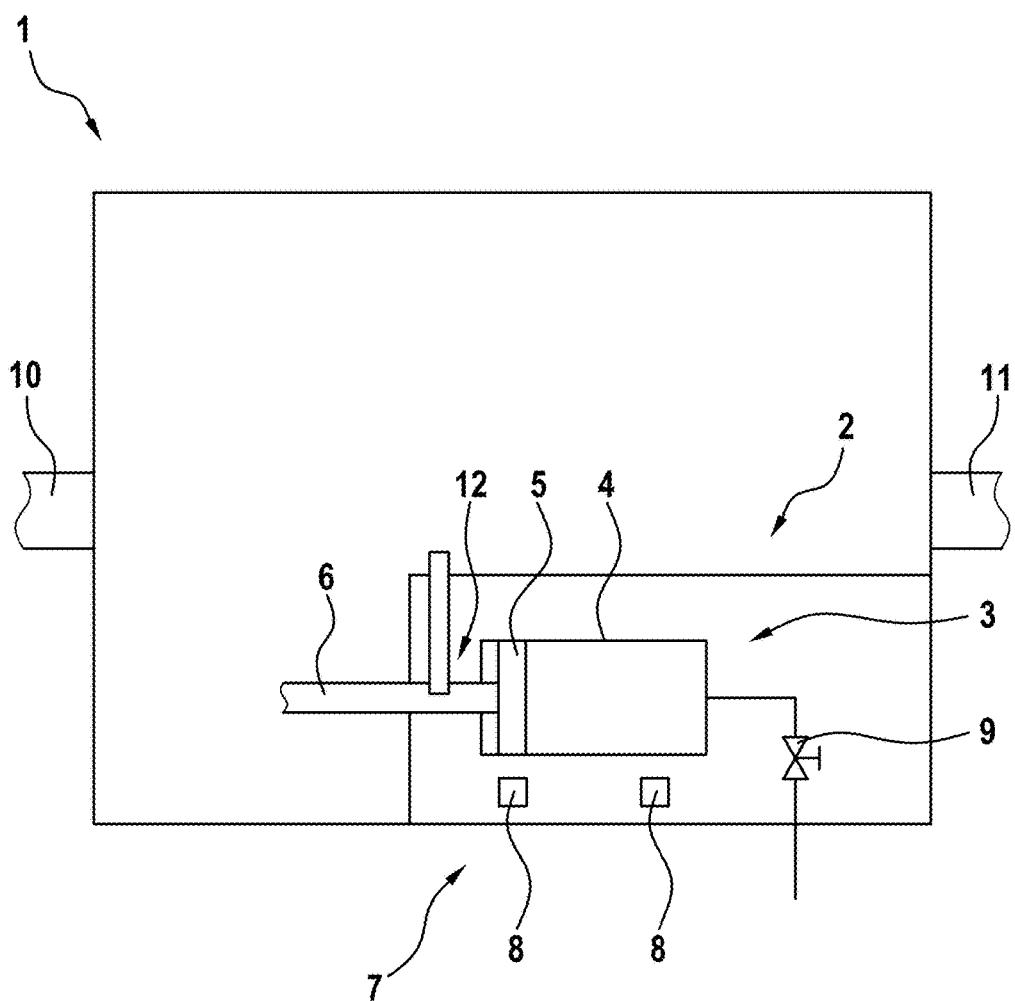

METHOD FOR OPERATING AN AUTOMATIC TRANSMISSION APPARATUS AND CORRESPONDING AUTOMATIC TRANSMISSION APPARATUS

FIELD

The invention relates to a method for operating an automatic transmission apparatus having a parking lock device, in which the parking lock device has a hydraulic apparatus with a hydraulic cylinder and a hydraulic piston arranged therein, which can be placed in at least two positions by means of a lock apparatus, as well as has an emergency unlock apparatus, in which the hydraulic piston is operatively connected to a shifting shaft of the parking lock device and a pressure can be adjusted in the hydraulic cylinder by means of a hydraulic valve, and in which the shifting shaft can be shifted within an operating position range by means of the hydraulic cylinder. The invention further relates to an automatic transmission apparatus.

BACKGROUND

The automatic transmission apparatus is allocated, for example, to a motor vehicle and preferably lies, in this respect, between a drive apparatus of the motor vehicle and at least one driven axle. The automatic transmission apparatus is used to select, in a driving operation of the motor vehicle, different gear ratios, which are subsequently present between the drive apparatus and the at least one driven axis. The automatic transmission apparatus here provides multiple driving gears, which preferably have gear ratios that are different from one another. For example, several of said driving gears are formed as forward gears and at least one driving gear is formed as a reverse gear.

The automatic transmission apparatus preferably adjusts the gear ratio as a function of an operating state, for example as a function of a torque and/or a rotational speed, particularly of the drive apparatus. The drive apparatus in this case can preferably be designed as an internal combustion engine or, however, as a hybrid drive apparatus, particularly having an internal combustion engine as well as an electric engine.

The automatic transmission apparatus is preferably dealt with by means of a so-called "shift-by-wire" activation. This means that an exclusively electronic and/or optical communication is present between a selector lever and the automatic transmission apparatus, particularly that there is no mechanical and/or hydraulic communication. A driver of the motor vehicle can select the desired gear on the selector lever by shifting the selector lever to a certain setting. For example, the selector lever can be arranged to a park setting "P", a reverse setting "R", a neutral setting "N", and a forward driving setting "D". The setting of the selector lever is transmitted to the automatic transmission apparatus electronically and/or optically as previously explained, particularly exclusively in this manner.

In order to safely set the motor vehicle in the park setting of the selector lever, that is to prevent the motor vehicle from rolling away, the automatic transmission apparatus provides the parking lock device. Said device has the hydraulic apparatus, which provides the hydraulic cylinder and the hydraulic piston. The hydraulic piston is arranged so that it can be shifted in the hydraulic cylinder. The lock apparatus, by means of which the hydraulic piston can be set in one of at least two positions within the hydraulic cylinder, is allocated to the hydraulic cylinder or the hydraulic piston.

The pressure present in the hydraulic cylinder can be adjusted using the hydraulic valve. The position of the hydraulic piston within the hydraulic cylinder depends here—provided it is not set by means of the lock apparatus—on this pressure. In this respect, the position of the hydraulic piston within the hydraulic cylinder can be adjusted by way of the hydraulic valve; in particular, it can be adjusted in a controlled and/or regulated manner. Preferably, the shifting shaft can be shifted exclusively within the operating position range by means of the hydraulic apparatus.

With the assistance of the hydraulic valve, the hydraulic piston can be shifted in this respect only into positions that correspond to positions of the shifting shaft in the operating position range. The shifting shaft, which is allocated to the park locking device, is operatively connected to the hydraulic piston. The park locking device is either activated or deactivated, as a function of its setting or the setting of the hydraulic piston in the hydraulic cylinder, by means of the shifting shaft. Within the operating position range, there is a first position with respect to this, in which the shifting shaft is arranged in such a way that the park locking device is deactivated, while a second position is present as well within the operating position range, in which the park locking device is activated.

When the park locking device is activated, the automatic transmission apparatus is blocked, so that a torque transfer from an input shaft of the automatic transmission apparatus to an output shaft and/or the reverse is suppressed. Preferably, at least the output shaft is blocked when the park locking device is activated. The input shaft is preferably operatively connected or can be operatively connected to the drive apparatus, while the output shaft is operatively connected or can be operatively connected to the at least one driven axle of the motor vehicle.

For example, the lock apparatus is then used to set the hydraulic piston and/or the shifting shaft either in the first position or the second position. When the lock apparatus is activated, the hydraulic piston and the switching shaft are set, in this respect, in such a way that they cannot be moved out of the instantaneously present position, particularly not out of the first position and/or the second position. With the assistance of the lock apparatus, thus the instantaneous operating state of the park locking device is reliably maintained, so that it cannot result in an unintentional rolling movement of the motor vehicle and/or an unintentional blocking of the automatic transmission apparatus while the motor vehicle is traveling.

Should this result in a malfunction in the automatic transmission apparatus, particularly in the park locking device, it is possible for the motor vehicle to essentially be ready for travel but that the park locking device will not allow a driving operation of the motor vehicle. For this reason, the driver of the motor vehicle is given the option of deactivating the park locking device by means of the emergency unlock apparatus. The emergency unlock apparatus enables, for example, a manual shifting of the shifting shaft. However, with known automatic transmission apparatuses, it cannot be determined whether the park locking device was deactivated by means of the emergency unlock apparatus.

SUMMARY OF THE DISCLOSURE

Thus, the object of the invention is to propose a method for operating an automatic transmission apparatus, which has advantages over the known prior art, particularly that it enables detection of the use of the emergency unlock apparatus to deactivate the park locking device.

In doing so, a provision is that, upon activation of the emergency unlock apparatus, the switching shaft is shifted into a position that is outside of the operating position range and that an operating state of the emergency unlock apparatus is checked, in which an activated emergency unlock apparatus is detected when a position of the switching shaft, which is outside of the operating position range, is determined over a certain timeframe by means of a position sensor, and/or when a distance traveled by the switching shaft, detected by means of the position sensor, exceeds a limit value. The park locking device is preferably deactivated, i.e. the automatic transmission apparatus is not (no longer) blocked in the position in which the shifting shaft is placed by means of the emergency unlock apparatus.

The emergency unlock apparatus is thus designed in such a way, upon its activation, the switching shaft is shifted in such a way that it subsequently lies outside of the operating position range. A provision may be that the hydraulic piston is also shifted when the switching shaft is shifted. It is especially preferred, however, when the switching shaft can be shifted by means of the emergency unlock apparatus independently of the hydraulic piston. The activation of the emergency unlock apparatus means that the switching shaft is not in a position that is adjustable by means of the hydraulic apparatus.

In this regard, it represents an extremely simple and elegant solution for determining the position of the switching shaft by means of the position sensor and detecting the activated emergency unlock apparatus when the instantaneous position of the switching shaft is outside of the operating position range. Thus, the operating state of the emergency unlock apparatus can be checked and determined in a simple manner. The operating state of the emergency unlock apparatus here indicates whether the emergency unlock apparatus for deactivating the park locking device was activated or whether it is not activated.

Additionally or alternatively, the distance traveled by the switching shaft can be detected by means of the position sensor, in which particularly only the distance traveled in one direction is considered. If the recorded distance exceeds the limit value, it can also be concluded that the position of the shifting shaft is outside of the operating position range and consequently, the emergency unlock apparatus for deactivating the park locking device was deactivated. The limit value here can be selected in such a way that, when it is exceeded, the position is reliably outside the operating position range. For example, the limit value corresponds to the size of the operating position range, i.e. the difference between the borders adjoining the operating position range.

Furthermore, a provision may be to record a distance, by means of the position sensor, by which the shifting shaft is shifted, in particular over the timeframe. If the recorded distance exceeds a certain limit value, particularly if the position of the shifting shaft recorded by means of the position sensor deviates at least by the limit value from that position in which the park locking device is activated, the activated emergency unlock apparatus is detected, particularly when the aforementioned condition is likewise applicable.

In addition, within the scope of an additional variant, there can also be a check as to whether the lock apparatus has set the hydraulic piston in one of the positions over the specific timeframe. In this case, preferably then only the activated emergency unlock apparatus is detected when this condition is fulfilled. As a whole, it is thus determined whether the switching shaft has shifted, that is, has changed its position, particularly from the operating position range, even though the hydraulic piston is set by means of the lock apparatus.

Another variant, which can be applied in addition or as an alternative to the aforementioned variant, represents a check of the actual current of the hydraulic valve. Within this scope, the deviation between the target current of the hydraulic valve and the actual current is determined, particularly during the specific timeframe. For example, the maximum deviation between the target current and the actual current is determined during the overall timeframe. If the deviation and/or the maximum deviation does not exceed the limit value, is thus less than it, there can also be a conclusion that the shifting shaft was not shifted by means of the hydraulic apparatus but more likely with the assistance of the emergency unlock apparatus.

In another variant, the checking of the operating state is initiated as soon as the internal combustion engine is started and/or the voltage supply is established for igniting the internal combustion engine.

More preferably, the activated emergency unlock apparatus is detected when at least one, or preferably several, or particularly all, of the aforementioned conditions are applicable. In this regard, a mistaken detection of the activated emergency unlock apparatus is avoided.

In another embodiment of the invention, a provision is that the checking of the operating state is initiated when a park position is set on the automatic transmission apparatus and/or a position of the shifting shaft is determined, by means of the position sensor, which is within the operating position range, and/or the lock apparatus is activated to set the hydraulic piston, and/or the target current of the hydraulic valve corresponds to the actual current. In this case as well, it may be sufficient when one of the aforementioned conditions applies in order to initiate the checking of the operating state. However, it is especially preferred when several, or particularly all, of the aforementioned conditions are fulfilled. In particular, that condition and/or those conditions must be fulfilled that query the same variables during the verification.

A particularly preferred embodiment of the invention provides that the checking of the operating state is initiated when a drive setting that is different from the park setting is set on the automatic transmission apparatus. Even with a presumably deactivated park locking device, the previously described method can be applied in this respect in order to check the operating state of the emergency unlock apparatus, namely when the aforementioned condition applies.

In an enhancement of the invention, a provision is that an operating state of the hydraulic apparatus, which has the hydraulic cylinder and/or the hydraulic valve, is monitored. The hydraulic apparatus comprises at least the hydraulic cylinder. In addition, it may have the hydraulic valve. It is then a provision that the hydraulic apparatus is monitored for proper function. The operating state reflects, in this respect, whether a proper operation of the hydraulic apparatus is assured or whether a malfunction is present in the hydraulic apparatus.

Another preferred embodiment of the invention specifies that an operating state of the lock apparatus is monitored. In addition or as an alternative to the monitoring of the operating state of the hydraulic apparatus, the operating state of the lock apparatus can also be monitored. The lock apparatus is preferably operated separately from the hydraulic apparatus; in particular, it is based on a different functional principle. Thus, while the hydraulic apparatus functions hydraulically, the lock apparatus can function electrically and/or mechanically.

In another embodiment, a provision is that the checking of the operating state of the emergency unlock apparatus is suspended when the operating state of the hydraulic apparatus and/or the operating state of the lock apparatus indicates a defect. If at least one of these conditions applies, the aforementioned conditions, which are used to check the operating state of the emergency unlock apparatus, can no longer be reliably evaluated. For this reason, the checking of the operating state of the emergency unlock apparatus should be suppressed as soon as one of the operating states or both of the operating states of the hydraulic apparatus and the lock apparatus indicate(s) the defect.

Finally, in another embodiment of the invention, a provision may be that an electromagnetic lock apparatus is used as the lock apparatus. It has been previously pointed out that the lock apparatus is preferably based on a different functional principle than the hydraulic apparatus. More preferably, it is formed as an electromagnetic lock apparatus so that it sets the hydraulic piston within the hydraulic cylinder while using at least one electromagnet.

The invention further relates to an automatic transmission apparatus, particularly for implementing the previously explained method, having a parking lock device, in which the parking lock device has a hydraulic apparatus with a hydraulic cylinder and a hydraulic piston arranged therein, which can be placed in at least two positions by means of a lock apparatus, as well as an emergency unlock apparatus, in which the hydraulic piston is operatively connected to a shifting shaft of the parking lock device and a pressure can be adjusted in the hydraulic cylinder by means of a hydraulic valve, and in which the shifting shaft can be shifted within an operating position range by means of the hydraulic apparatus.

The automatic transmission apparatus is designed to shift the shifting shaft into a position that is outside of the operating position range upon activation of the emergency unlock apparatus. In doing so, a provision is that an operating state of the emergency unlocked apparatus is checked, in which an activated emergency unlocked apparatus is detected when a position of the shifting shaft is detected that is outside of the operating position range, over a specific timeframe by means of a position sensor.

An indication has already been made of the advantages of this type of procedure and/or this type of embodiment of the automatic transmission apparatus. Both the automatic transmission apparatus as well as the method may be further enhanced according to the aforementioned designs.

BRIEF DESCRIPTION OF THE DRAWINGS

The invention is explained in more detail in the following by means of exemplary embodiments shown in the drawing, without limiting the invention. In doing so, the only FIGURE shows a schematic representation of an automatic transmission apparatus having a park locking device.

DETAILED DESCRIPTION OF THE DRAWINGS

The FIGURE shows a schematic representation of an automatic transmission apparatus 1, which is allocated to a motor vehicle, for example. In this context, the automatic transmission apparatus 1 may be provided in an operative connection between a drive apparatus of the motor vehicle and at least one driven axle of the motor vehicle. The automatic transmission apparatus 1 provides a park locking device 2, which has a hydraulic apparatus 3. The hydraulic apparatus has a hydraulic cylinder 4 and a hydraulic piston 5 arranged in said cylinder. The hydraulic piston 5 is operatively connected to a shifting shaft 6 of the park locking device 2, particularly directly attached to it.

With the assistance of the hydraulic apparatus 3, the shifting shaft 6 can be shifted in this regard, preferably within an operating position range. Furthermore, the park locking device 2 provides a lock apparatus 7, which has, for example, a plurality of electromagnetic assemblies 8. The shifting shaft 6 and/or the hydraulic piston 5 can be set at certain positions within the operating position range by means of the electromagnetic assemblies 8. The hydraulic cylinder 4 is hydraulically connected to a hydraulic valve 9. In particular, the hydraulic cylinder 4 is hydraulically connected to a hydraulic pressure source via the hydraulic valve 9. This means that the pressure in the hydraulic cylinder 4 can be adjusted by means of the hydraulic valve 9 and the hydraulic piston 5 can be shifted in this respect within the hydraulic cylinder 4.

In the schematic representation shown here, the hydraulic cylinder 4 is only connected to the one hydraulic valve 9. Obviously, there may be a provision that several hydraulic valves 9 or a hydraulic valve assembly is hydraulically connected to the hydraulic piston 4, wherein the valves or the assembly is (are) preferably provided on opposite sides of the hydraulic piston 5, so that the hydraulic piston 5 can optionally be loaded with hydraulic pressure by either side and can be shifted in this respect.

The park locking device is activated by means of the hydraulic apparatus 3 via the shifting shaft 6. In a first position, the park locking device 2 in this case is provided to release the automatic transmission apparatus 1, while, in a second position, the park locking device 2 locks the automatic transmission apparatus 1, so that an operative connection in this respect is interrupted between an input shaft 10 and an output shaft 11. In particular, the output shaft 11 can be completely set by means of the park locking device 2 so that the motor vehicle is secured against rolling away.

It is then a provision that the shifting shaft 6 can be shifted by means of an emergency unlock apparatus 12 (only implied here). The emergency unlock apparatus 12 is used to deactivate the park locking device 2, i.e. to effect the unlocking of the automatic transmission apparatus 1 when this is no longer possible based on the hydraulic apparatus 3 and/or the lock apparatus 7, for example, because a control unit activates the hydraulic apparatus 3 and the lock apparatus 7 for permanent activation of the park locking device 2. With the assistance of the emergency unlock apparatus 12, the shifting shaft 6 can be shifted in such a way that it is outside of the operating position range.

A provision is that an operating state of the emergency unlock apparatus 12 is checked. In doing so, an activated emergency unlock apparatus 12 should be detected when, particularly over a specific timeframe, a position of the shifting shaft 6 is determined that is outside of the operating position range by means of a position sensor, which is not shown here. A provision may also be to record a distance by which the shifting shaft is shifted by means of the position sensor, in particular over the timeframe. If the recorded distance exceeds a certain limit value, particularly if the position of the shifting shaft 6 recorded by means of the position sensor deviates at least by the limit value from that position in which the park locking device is activated, the activated emergency unlock apparatus 12 is detected, particularly when additionally the position is outside of the operating position range.

In addition, there can be a check to determine whether the lock apparatus 7 has set the hydraulic piston 5 in one of the positions over the specific timeframe. Additionally or alternatively, there can be a check to determine whether a deviation between a target current of the hydraulic valve 9 and an actual current is smaller than a certain limit value over the specific timeframe. For example, several, and particularly all, of the aforementioned conditions must be fulfilled so that the activated emergency unlock apparatus 12 is detected.

In this manner, a reliable detection is possible as to whether the automatic transmission apparatus 1 has been released by means of the emergency unlock apparatus 12.

The invention claimed is:

1. A method for operating an automatic transmission apparatus having a park locking device, wherein the park locking device has a hydraulic apparatus with a hydraulic cylinder and a hydraulic piston arranged therein, which can be placed in at least two positions by an electromagnetic lock apparatus, as well as an emergency unlock apparatus, wherein the hydraulic piston is operatively connected to a shifting shaft of the park locking device, and a pressure in the hydraulic cylinder can be adjusted by a hydraulic valve, and wherein the shifting shaft can be shifted within an operating position range by the hydraulic apparatus, the operating position range comprising at least a first point defined by a first position of the at least two positions of the hydraulic piston and a second point defined by a second position of the at least two positions of the hydraulic piston, wherein the method comprises:
   upon activation of the emergency unlock apparatus, shifting the shifting shaft into a position that is outside of the operating position range, and checking an operating state of the emergency unlock apparatus, and
   detecting an activation of an activated emergency unlock apparatus when a position of the shifting shaft, which is outside of the operating position range, is determined over a specific timeframe by a position sensor, and when a distance traveled by the shifting shaft, detected by the position sensor, exceeds a limit value.

2. The method according to claim 1, wherein the operating state is checked when at least one of the following occurs:
   the automatic transmission apparatus is set from a non-park position into a park position, the non-park position and the park position being positions in the at least two positions;
   the position sensor, configured to detect the shifting shaft and a position thereof, detects that the position of the shifting lies within the operating position range;
   the lock apparatus is activated for setting the hydraulic piston; and
   a target current of the hydraulic valve corresponds to an actual current of the hydraulic valve.

3. The method according to claim 1, wherein the operating state is checked when a drive setting that is different from a park setting is set on the automatic transmission apparatus.

4. The method according to claim 1, wherein the operating state is checked as soon as an internal combustion engine is started and a voltage supply is established for igniting the internal combustion engine.

5. The method according to claim 1, wherein an operating state of the hydraulic apparatus, which has the hydraulic cylinder and the hydraulic valve, is monitored, and an operating state of the lock apparatus is monitored.

6. The method according to claim 5, wherein the checking of the operating state of the emergency unlock apparatus is suspended when the operating state of the hydraulic apparatus and the operating state of the lock apparatus indicate a defect.

7. An automatic transmission apparatus, having a park locking device, wherein the park locking device has a hydraulic apparatus with a hydraulic cylinder and a hydraulic piston arranged therein, which can be placed in at least two positions by an electromagnetic lock apparatus, as well as an emergency unlock apparatus, wherein the hydraulic piston is operatively connected to a shifting shaft of the park locking device and a pressure in the hydraulic cylinder can be adjusted by a hydraulic valve, and wherein the shifting shaft can be shifted within an operating position range by the hydraulic apparatus, the operating position range comprising at least a first point defined by a first position of the at least two positions of the hydraulic piston and a second point defined by a second position of the at least two positions of the hydraulic piston,
   wherein, upon activation of the emergency unlock apparatus, the automatic transmission apparatus is designed to shift the shifting shaft into a position that is outside of the operating position range, and an operating state of the emergency unlock apparatus is checked,
   wherein an activated emergency unlock apparatus is detected when a position of the shifting shaft, which is outside of the operating position range, is determined over a specific timeframe by a position sensor, and when a distance traveled by the shifting shaft, detected by the position sensor, exceeds a limit value.

* * * * *